United States Patent [19]
Wyatt

[11] Patent Number: 5,613,660
[45] Date of Patent: Mar. 25, 1997

[54] SANITARY ICE-SCOOP HOLDER

[76] Inventor: Charles A. Wyatt, 105G Telegraph Rd., Honey Brook, Pa. 19344

[21] Appl. No.: 320,278

[22] Filed: Oct. 11, 1994

[51] Int. Cl.⁶ .................................................. A47F 7/00
[52] U.S. Cl. ........................................ 248/300; 248/314
[58] Field of Search .............................. 248/37.3, 37.6, 248/300, 311.2, 314, 223.41, 224.6, 224.7, 225.11; 294/55

[56] References Cited

U.S. PATENT DOCUMENTS

| | | | |
|---|---|---|---|
| 272,446 | 2/1883 | Kidder | 248/300 X |
| 825,774 | 7/1906 | Stumm | 248/300 X |
| 2,845,245 | 7/1958 | Gray et al. | 248/314 |
| 3,589,758 | 6/1971 | King | 248/224.1 X |
| 3,840,261 | 10/1974 | Fulkerson et al. | 248/311.2 X |
| 4,299,344 | 11/1981 | Yamashita et al. | 248/314 X |
| 4,458,960 | 7/1984 | Dunst | 294/55 X |
| 5,072,909 | 12/1991 | Huang | 248/311.2 |

Primary Examiner—Alvin C. Chin-Shue
Assistant Examiner—Derek J. Berger
Attorney, Agent, or Firm—Frederick J. Olsson

[57] ABSTRACT

An ice scoop holder includes a flat back member, two flat side members which extend normally outwardly from the back member and have inwardly turned flanges. The back member, the side members, and flanges form a hollow, free-from-obstruction cavity to receive and support a scoop.

4 Claims, 1 Drawing Sheet

SANITARY ICE-SCOOP HOLDER

This invention relates to food service devices and especially to hand-held, behind-the-counter ice cube dispensing utensils.

More particularly the invention relates to a scoop of the type which when not in use is laid down on ice cubes in a bin and which is picked up for scooping out ice cubes to deposit, the same in a beverage container and then laid down again. The invention addresses the problem of isolating the handle of the scoop from the ice when the scoop is set down after use.

With the increase in communicable diseases of the type which may be transmitted from one item to another by virtue of hand contact it becomes vitally important to insure that, after being used, the handle of the scoop does not come in contact with ice cubes.

The invention provides a holder or cradle for ice cube scoops which is constructed and positioned so as to motivate the server to place the scoop back in the holder after use rather than setting the scoop down on the ice.

According to the invention, an ice scoop holder is constructed to provide alternative scoop storage modes each placing the holder to be clearly viewable by the server, for example, by being fixedly mounted interiorly of the ice bin and surrounded by the ice cubes, but maintaining the scoop handle above the ice surface or which can be mounted on the outside of the bin either by being fixed by screws to a wall or hooked over the top edge of a wall.

In either one of the modes, the part of the scoop which carries the ice cubes is not touched by the hands and the handle part of the scoop which is engaged by the server's hand is maintained out of contact with the ice cubes. Therefore, the objective of sanitation is achieved.

The invention will be described below in connection with the following drawings wherein.

The holder is made of stainless steel or medical grade plastic. In the case of stainless steel, the holder is formed from a single blank which is bent into desired shape in the case of plastic the holder is injection molded.

Figure 1:
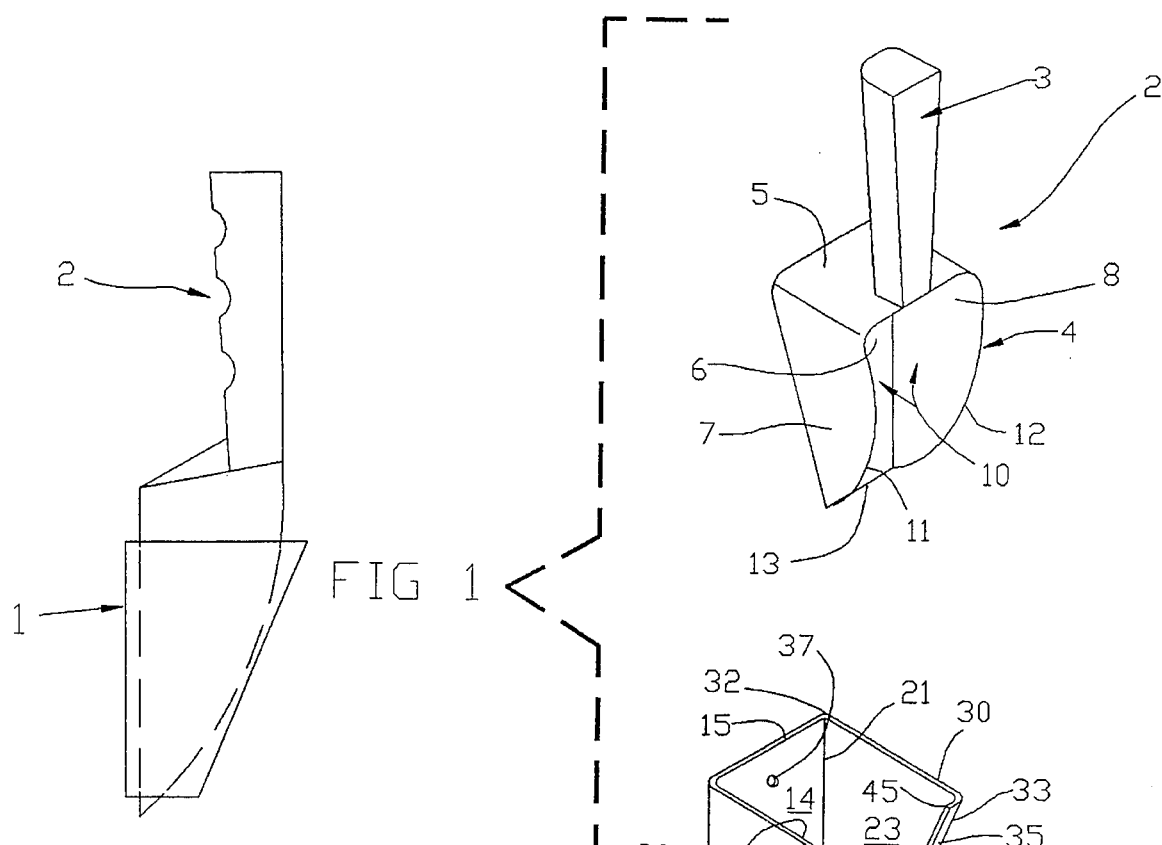
FIG. 1 is an exploded view showing the holder and a typical ice scoop.

In FIG. 1, the holder is indicated at 1 and a typical scoop is indicated at 2. The typical scoop 2 has a handle section 3 and ice carrier section 4.

The carrier section 4 has a top 5, a flat back 6, and a pair of flat sides 7 and 8 forming an open inside section 10 for carrying ice cubes. It will be observed that the outer edges 11 and 12 of the sides 7 and 8 are curvedly tapered from the top 5 to the lower edge 13 of the back 6.

The holder 1 has a flat rectangular back member 14 having a top edge 15, a bottom edge 16, first side edge 20 and second side edge 21 each of which extend between the top and bottom edges 15 and 16.

The holder 1 also includes the first side member 22 and a second side member 23. The first side member 22 has a top edge 24, a bottom edge 25, an inner side edge 26, and an outer side edge 27.

The outer side edge 27 is oriented at an acute angle with respect to the top edge 24 and at an obtuse angle with respect to the bottom edge 25.

The first side edge 20 of the back member 14 is joined with the inner side edge 26 of the first side member 22.

The second member 23 has a top edge 30, a bottom edge 31, an inner side edge 32, and an outer side edge 33.

The outer side edge 33 is shaped in the same manner as the outer side edge 27.

The second side edge 21 of the back member 14 is joined with the inner side edge 32 of the second side member 23.

A first retainer flange 34 is joined to and extends along the outer side edge 27 and extends inwardly toward the second side member 23.

A second retainer flange 35 is joined to and extends along the outer side edge 33 and extends inwardly toward the flange 34.

Figure 2:
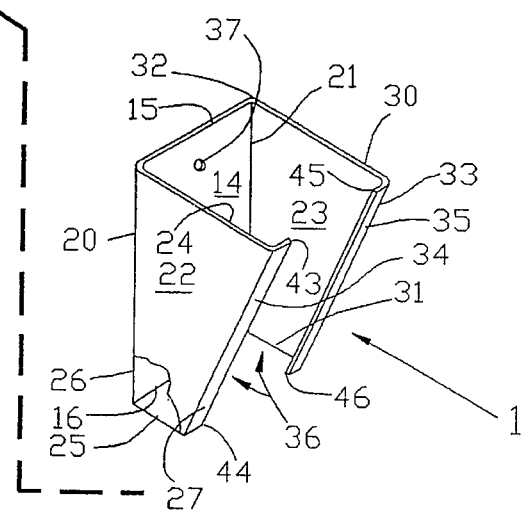
FIG. 2 is a side elevation view showing the holder and scoop of FIG. 1 assembled together.

It will be apparent that the back member 14, the first side member 22, the second side member 23 together with the retainer flanges 34 and 35 form a scoop cavity 36, which is open at the top and bottom and decreases in cross section in a direction between the top and the bottom. The cavity 36 is adapted to receive the carrier section 4 of the scoop as shown in FIG. 2.

The holder is adapted to be fixed to a wall of the ice bin or hung over a top edge of the ice bin.

For fixedly mounting the holder the back member 14 is provided with or more openings, one of which is noted at 37. The opening receives a screw or a pop rivet. In the fixed arrangement the holder is secured to a wall of the bin either on the inside at the top of the bin or on the outside also at the top. In either case, it is evident that the handle is in clear view of the attendant or server.

Figure 3:
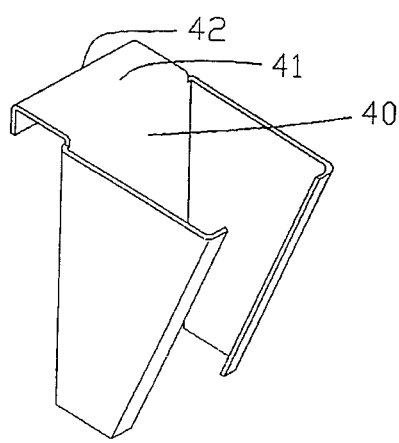
FIG. 3 is a perspective view illustrating a holder with hook-type suspension means.

The holder is adapted to be in a non-fixed condition and this is illustrated in FIG. 3. The back member 40 (same as back member 14) is provided with a lip 41 which extends along the top edge of the back member 40 and extends outwardly and is bent at 42 into a hook-like form by which the holder can be suspended from a wall of the bin.

Before closing, I want to point out that the top and bottom edges of the flanges 34 and 35 at the points indicated at 43, 44, 45, and 46 are rounded off.

I claim:

1. A sanitary ice scoop holder comprising:

A flat rectangular shaped back member having a top edge, a bottom edge and first and second side edges each extending between the top and bottom edges;

a first flat side member extending away from and normal to said back member and having a top edge, a bottom edge, an inner side edge and an outer side edge, the outer side edge being oriented at an acute angle with respect to the top edge of the first side member and at an obtuse angle with respect to the bottom edge of the first side member;

a second flat side member extending away from and normal to said back member and having a top edge, a bottom edge an inner side edge and an outer side edge, the outer side edge of the second side member being oriented at an acute and with respect to the top edge of the second side member and at an obtuse and with respect to the bottom edge of the second side member;

the inner side edge of said first side member being connected to said first side edge of said back member;

the inner side edge of said second side member being connected to said second side edge of said back member;

a first flat retainer flange connected to the outer side edge of said first side member and extending in a direction toward said second side member;

a second flat retainer flange connected to the outer side edge of said second side member and extending in a direction toward said first side member; and said back member, said first and second side members, and said first and second retainer flanges forming a cavity to hold an ice scoop, the cavity being free from obstruction and decreasing in cross section in a direction as between the top and bottom edges of said first and second side members and last said back member, side members and retainer flanges being adapted for engagement with an ice scoop placed in the cavity.

2. The holder of claim 1 wherein said back member is provided with holes for use in receiving mounting screws.

3. The holder of claim 1 further including mounting lip means extending along the top edge of said back member and extending outwardly from said the back member in a direction away from said cavity, the lip means being bent into hook form use in suspending the holder.

4. The holder of claim 1 wherein:

said first retainer flange has a top edge, a bottom edge, and a front edge and the intersections of the front edge and the top and bottom edges are each respectively rounded; and said second retainer flange has a top edge and a bottom edge, and a front edge and the intersections of the front edge and the top and bottom edges are each respectively rounded.

* * * * *